United States Patent
Yamashita (10) Patent No.: US 9,407,903 B2
(45) Date of Patent: Aug. 2, 2016

(54) STEREOSCOPIC IMAGE SHOOTING APPARATUS

(75) Inventor: Toshiyuki Yamashita, Sakaishi (JP)

(73) Assignee: KONICA MINOLTA OPTO, INC., Tokyo (JP)

( * ) Notice: Subject to any disclaimer, the term of this patent is extended or adjusted under 35 U.S.C. 154(b) by 742 days.

(21) Appl. No.: 13/310,327

(22) Filed: Dec. 2, 2011

(65) Prior Publication Data

US 2012/0140046 A1     Jun. 7, 2012

(30) Foreign Application Priority Data

Dec. 2, 2010   (JP) ................. 2010-269007

(51) Int. Cl.
*H04N 13/02*     (2006.01)
*H04N 13/00*     (2006.01)

(52) U.S. Cl.
CPC ....... *H04N 13/0217* (2013.01); *H04N 13/0037* (2013.01); *H04N 13/0214* (2013.01); *H04N 13/0257* (2013.01)

(58) Field of Classification Search
CPC .................................................. H04N 13/0214
USPC ............................................. 348/49, E13.006
See application file for complete search history.

(56) References Cited

U.S. PATENT DOCUMENTS

| | | | |
|---|---|---|---|
| 6,271,876 B1 | 8/2001 | McIntyre et al. | |
| 2001/0033326 A1* | 10/2001 | Goldstein | A61B 1/041 348/42 |
| 2007/0159640 A1* | 7/2007 | Berestov | 356/611 |
| 2009/0102939 A1* | 4/2009 | Ahuja et al. | 348/222.1 |
| 2010/0030021 A1* | 2/2010 | Minai et al. | 600/109 |

FOREIGN PATENT DOCUMENTS

| | | |
|---|---|---|
| EP | 1 940 181 | 7/2008 |
| JP | 08-171151 | 7/1996 |
| JP | 2001-016621 | 1/2001 |
| JP | 2008-153931 | 7/2008 |

OTHER PUBLICATIONS

Search Report dated Sep. 6, 2013 issued in the corresponding European Patent Application No. 11 19 1505.4.

* cited by examiner

*Primary Examiner* — Christopher S Kelley
*Assistant Examiner* — Jonathan Messmore
(74) *Attorney, Agent, or Firm* — Cozen O'Connor (57) ABSTRACT

A compound-eye type stereoscopic image shooting apparatus has a single image sensing device and two shooting optical systems. The two shooting optical systems include a first shooting optical system for forming a first subject image composed of light in a first wavelength range alone and a second shooting optical system for forming a second subject image composed of light in a second wavelength range alone which is different from the first wavelength range. The image sensing device has an image sensing surface divided into a first image sensing area for recording the first subject image and a second image sensing area for recording the second subject image. The image sensing device has, on the image sensing surface, a wavelength filter that transmits, in the first image sensing area, light in the first wavelength range alone and, in the second image sensing area, light in the second wavelength range alone.

17 Claims, 9 Drawing Sheets

STEREOSCOPIC IMAGE SHOOTING APPARATUS

Priority is claimed for this application based on Japanese Patent Application No. 010-269007 filed on Dec. 2, 2010, the contents of which are hereby incorporated by reference.

BACKGROUND OF THE INVENTION

1. Field of the Invention

The present invention relates to a stereoscopic image shooting apparatus, and more particularly to a stereoscopic image shooting apparatus of a compound-eye type which performs stereoscopic shooting of a subject by use of a single image sensing device and two shooting optical systems.

2. Description of Related Art

In compound-eye stereoscopy using a single image sensing device, the image sensing surface of the image sensing device is used in a form divided into a left and a right image sensing area. In such a case, diffraction may cause one image to be seen in the other. That is, the image circle formed by the left shooting optical system may intrude into the right shooting area, or the image circle formed by the right shooting optical system may intrude into the left shooting area. In the image shooting apparatus disclosed in Patent Document 1 listed below, image degradation due to such intrusion between image circles is prevented by the provision of a partition wall between the left and right image sensing areas on the image sensing surface.

Patent Document 1: JP-A-H8-171151.

Inconveniently, however, with the stereoscopic image shooting apparatus disclosed in Patent Document 1, the provision of the partition wall constitutes an increase in the number of components. This complicates the adjustment of the position of the left and right images, and leads to increased cost.

SUMMARY OF THE INVENTION

The present invention has been made against the above background, and aims to provide a stereoscopic image shooting apparatus that has a simple and easy-to-adjust optical structure but can nevertheless prevent image degradation due to intrusion between left and right image circles.

To achieve the above aim, according to the present invention, in a stereoscopic image shooting apparatus of a compound-eye type which performs stereoscopic shooting of a subject by use of a single image sensing device and two shooting optical systems, the two shooting optical systems include a first shooting optical system for forming a first subject image composed of light in a first wavelength range alone and a second shooting optical system for forming a second subject image composed of light in a second wavelength range alone, the second wavelength range being different from the first wavelength range, the image sensing device has an image sensing surface divided into a first image sensing area for recording the first subject image and a second image sensing area for recording the second subject image, and the image sensing device has, on the image sensing surface, a wavelength filter that transmits, in the first image sensing area, the light in the first wavelength range alone and, in the second image sensing area, the light in the second wavelength range alone.

DETAILED DESCRIPTION OF PREFERRED EMBODIMENTS

Figure 1:
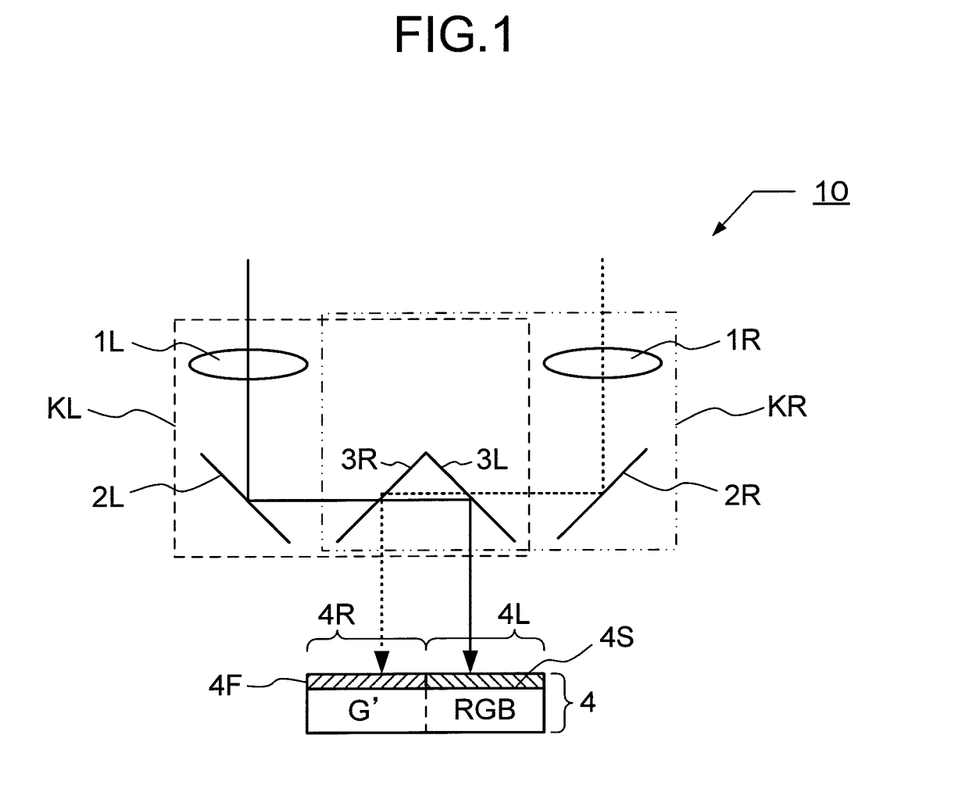
FIG. 1 is a schematic diagram showing a stereoscopic image shooting apparatus embodying the invention.
Figure 2:
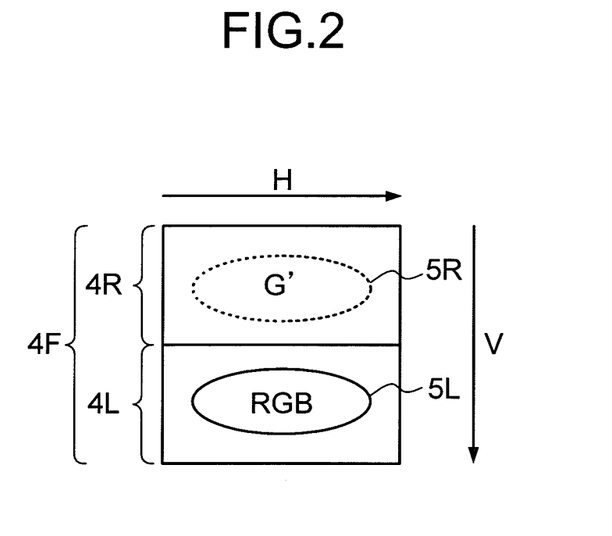
FIG. 2 is a front view of a wavelength filter on an image sensing surface divided into a first and a second image sensing area.
Figure 3:
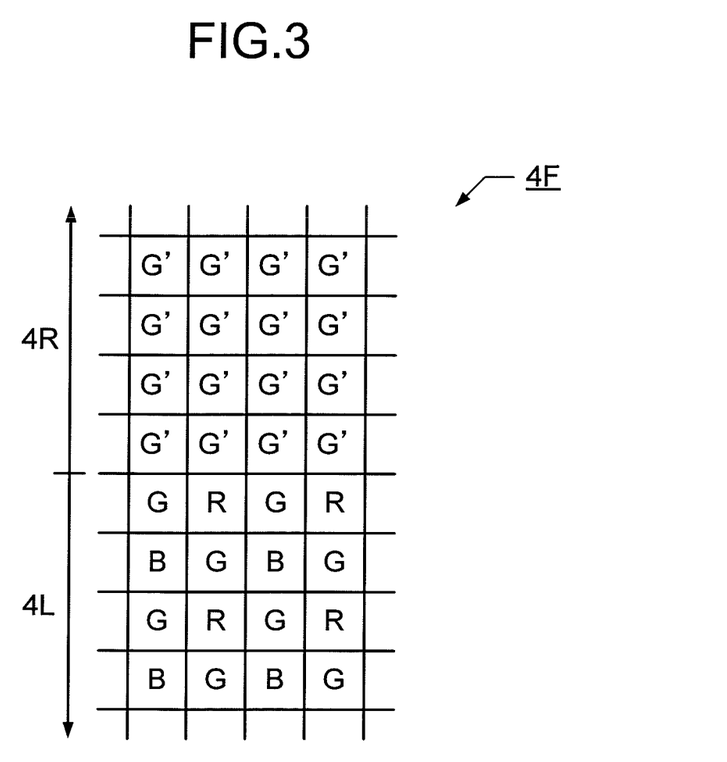
FIG. 3 is a diagram showing an example of the filter array of a wavelength filter.

Below, a stereoscopic image shooting apparatus etc. embodying the present invention will be described with reference to the accompanying drawings. FIG. 1 shows a stereoscopic image shooting apparatus 10 of a compound-eye type which performs stereoscopic shooting of a subject by use of a single image sensing device (for example, a CCD (charge-coupled device)) 4 and a first and a second shooting optical system KL and KR. FIG. 2 shows a wavelength filter 4F provided on the image sensing surface 4S of the image sensing device 4. FIG. 3 shows, on an enlarged scale, the filter array of the wavelength filter 4F, for each of a first image sensing area 4L and a second image sensing area 4R.

The first shooting optical system KL is composed of a first shooting lens 1L, a first reflecting mirror 2L, a G' (green) reflecting mirror 3R, a half-mirror 3L, etc. The second shooting optical system KR is composed of a second shooting lens 1R, a second reflecting mirror 2R, a half-mirror 3L, a G' (green) reflecting mirror 3R, etc. The G' reflecting mirror 3R and the half-mirror 3L are shared between the first and second shooting optical systems KL and KR. The G' reflecting mirror 3R reflects, on its reflective surface, G' light alone (and transmits light of wavelengths other than G'). The half-mirror 3L splits, on its reflective surface, the incident light into reflected light and transmitted light in terms of amount of light. Instead of the half-mirror 3L, any reflective optical device may be used that reflects, on its reflective surface, light of wavelengths other than G'.

The use of a reflective optical device, like the G' reflecting mirror 3R above, that deflects the optical path by reflection and simultaneously restricts the wavelength of light permits at least one of the shooting optical systems to serve, with its reflective surface, as a deflecting optical system. This helps secure a sufficient distance in the lateral direction (the direction along the pupil-to-pupil distance) to obtain parallax between the left and right sides. Moreover, since the reflective surface has the wavelength restricting function, its use combined with a color filter helps reduce cost.

The first shooting optical system KL forms, as a left image, a first subject image 5L composed of light in a first wavelength range alone, the first wavelength range being composed of three wavelengths of R (red), G (green), and B (blue) respectively. The second shooting optical system KR forms, as a right image, a second subject image 5R composed of light in a second wavelength range alone which is different from the first wavelength range, the second wavelength range being composed of a wavelength of G' (close to the wavelength of G). The image sensing device 4 has an image sensing surface 4S which is divided into a first image sensing area 4L for recording the first subject image 5L and a second image sensing area 4R for recording the second subject image 5R. On the image sensing surface 4S, the image sensing device 4 has a wavelength filter 4F which transmits, in the first image sensing area 4L, light in the first wavelength range of RGB alone and, in the second image sensing area 4R, light of the second wavelength range of G' alone. In the first image sensing area 4L, pixels are arranged in a Bayer array (FIG. 3).

The division between the first and second image sensing areas 4L and 4R is, preferably, so set that, as shown in FIG. 2, their boundary intersects the vertical transfer direction V on the image sensing surface 4S. If the boundary is parallel to the vertical transfer direction V, when a filter is fitted, two images mix in a particular row, and this may necessitate complicated data processing. When the boundary is set parallel to the horizontal transfer direction H, it is possible to process all data uniformly simply by specifying the position of the boundary.

Figure 4:
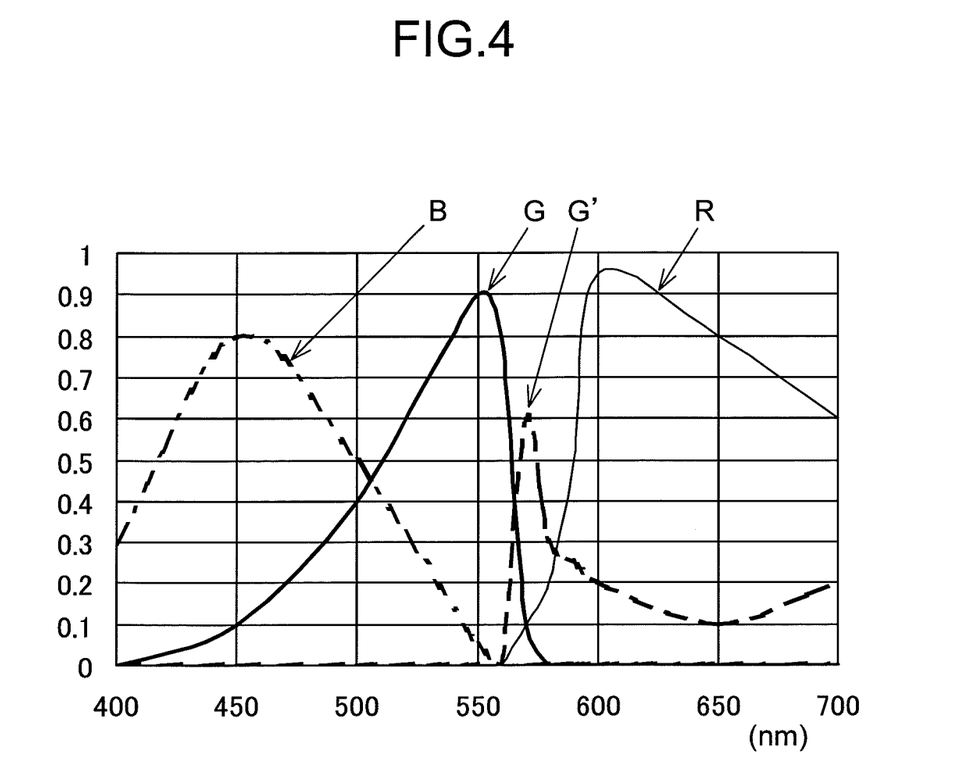
FIG. 4 is a graph showing the transmittance distribution of a first specific example of a wavelength filter.
Figure 5:
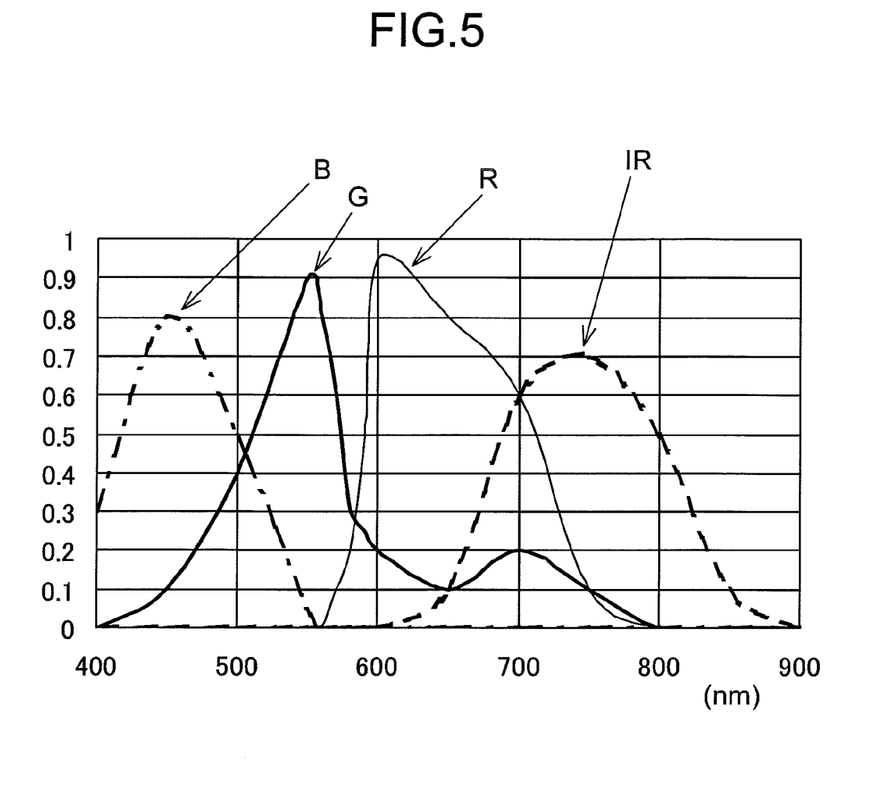
FIG. 5 is a graph showing the transmittance distribution of a second specific example of a wavelength filter.

FIG. 4 shows the transmittance distribution of a first specific example of the wavelength filter 4F, and FIG. 5 shows the transmittance distribution of a second specific example of the wavelength filter 4F. The wavelength filter 4F of which the transmittance distribution is shown in FIG. 4 has a main wavelength span of the second wavelength range between 560 nm and 590 nm. Setting the main wavelength span of the second wavelength range between 560 nm and 590 nm in this way permits, through stereoscopic matching in a green image, generation of parallax information in information to which the human eye is highly sensitive. Preferably, G' is so set as to have a peak as close to the center of G as possible.

The wavelength filter 4F of which the transmittance distribution is shown in FIG. 5 has the main wavelength span of the second wavelength range between 700 nm and 900 nm, and is so designed as to transmit, in the second image sensing area 4R, light in the second wavelength range alone, which is near-infrared (IR) light. Accordingly, when the second specific example is used, instead of the G' reflecting mirror 3R, an IR reflecting mirror is used. When the left and right wavelength ranges are close, poor light use efficiency in a green region results; thus, setting the main wavelength span of the second wavelength range in a near-infrared region between 700 nm and 900 nm helps increase light use efficiency. That is, using near-infrared light instead of G' increases G sensitivity in an RGB image, and helps improve image quality. Moreover, applications then go beyond stereoscopic image shooting apparatus into night-vision cameras.

Of the two subject images 5L and 5R (FIG. 2) formed on the image sensing surface 4S, the first subject image 5L, which is composed of light in the first wavelength range alone, is formed in the first image sensing area 4L, and the second subject image 5R, which is composed of light in the second wavelength range alone, is formed in the second image sensing area 4R. Even if the image circle of the first subject image 5L intrudes rightward into the second image sensing area 4R, or if the image circle of the second subject image 5R introduces leftward into the first image sensing area 4L, the wavelength filter 4F in the first image sensing area 4L only transmits RGB light in the first wavelength range, while the wavelength filter 4F in the second image sensing area 4R only transmits G' light in the second wavelength range; thus, in the first image sensing area 4L on the image sensing surface 4S, only RGB light in the first wavelength range is incident and is recorded as an image, and in the second image sensing area 4R on the image sensing surface 4S, only G' light in the second wavelength range is incident and is recorded as an image.

As described above, the wavelength filter 4F on the image sensing surface 4S transmits, in the first image sensing area 4L, RGB light alone and, in the second image sensing area 4R, G' light alone. In this way, the first and second subject images 5L and 5R that are composed of light of mutually different wavelengths in stereoscopy are shot. Here, even if the image circles of the first and second subject images 5L and 5R overlap, a clear image is obtained. In addition, no extra component such as a partition wall is needed. Thus, it is possible, with a simple and easy-to-adjust optical structure, to prevent image degradation due to intrusion between left and right image circles, advantageously from the perspective of cost as well.

Figure 6:
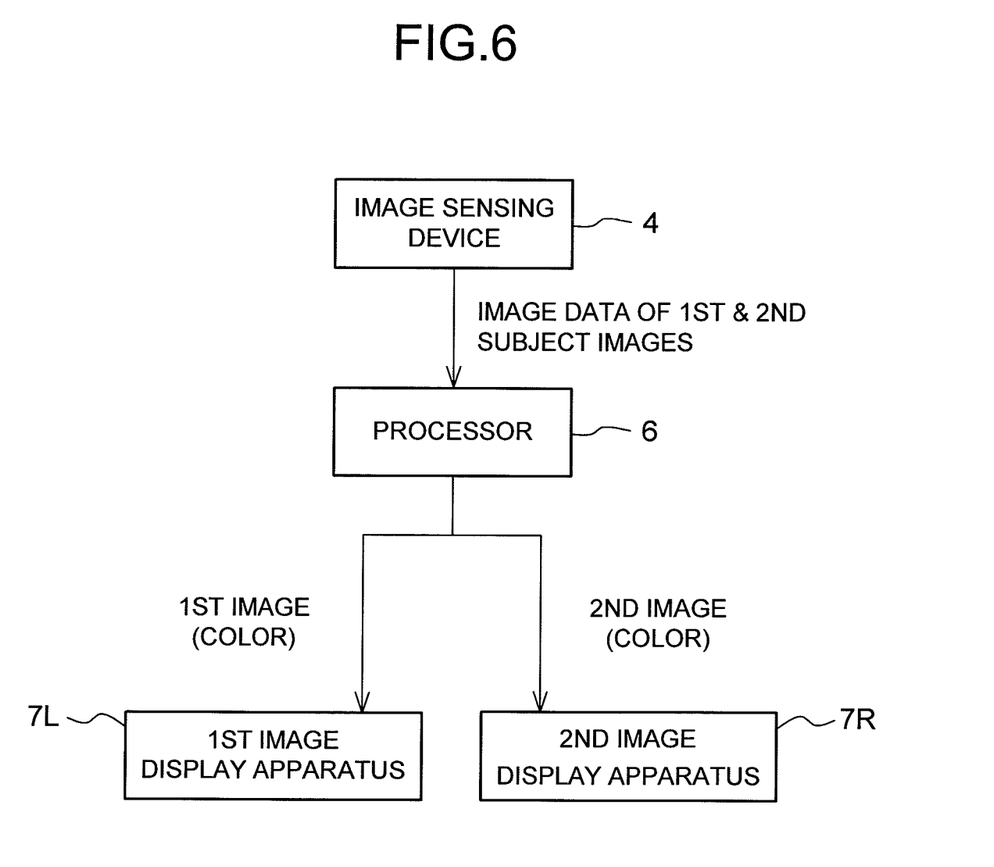
FIG. 6 is a block diagram showing an example of an outline configuration for image data processing in a stereoscopic image shooting apparatus.
Figure 7:
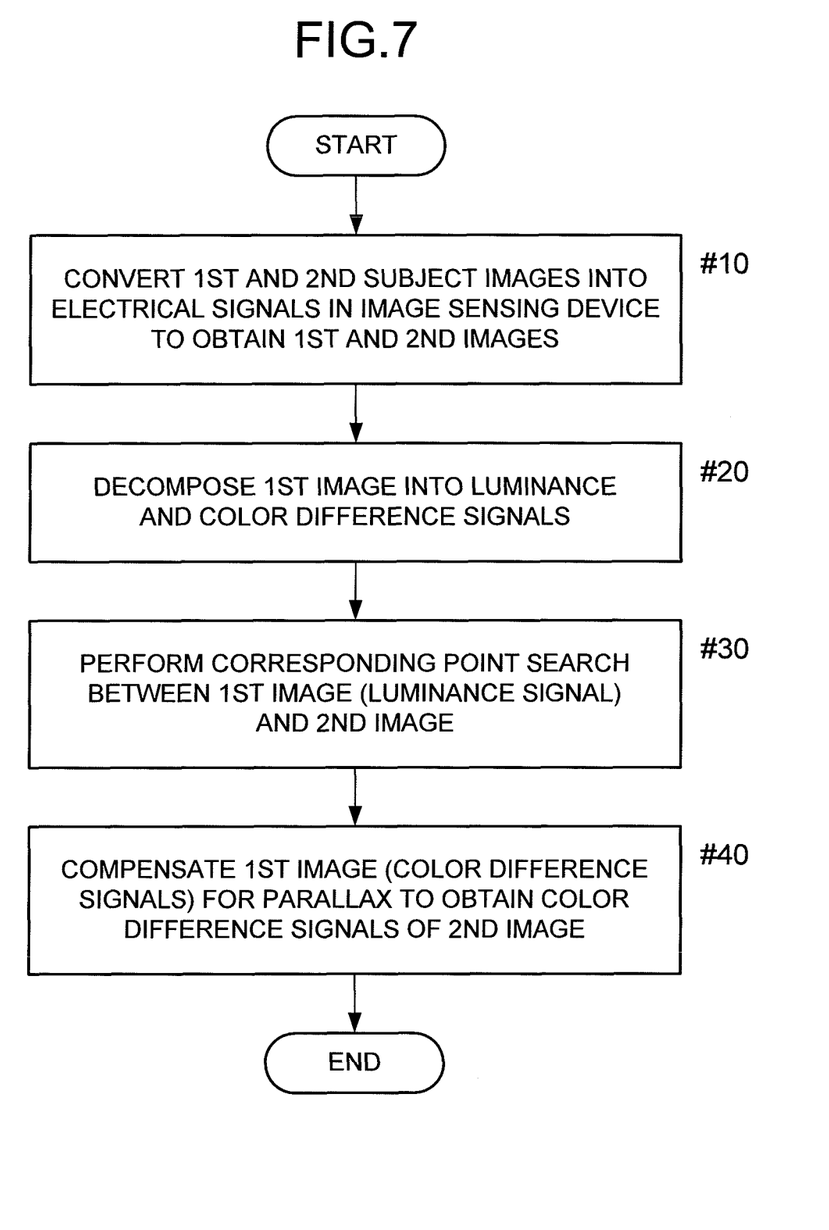
FIG. 7 is a control flow chart of image data processing in a stereoscopic image shooting apparatus.

FIG. 6 shows an example of an outlined configuration for image data processing in the stereoscopic image shooting apparatus 10, and FIG. 7 shows a control flow of the image data processing. When stereoscopic shooting is started, the first and second subject images 5L and 5R are converted into electrical signals in the single image sensing device 4 (#10 in FIG. 7) so as to be fed, as left and right image data as shown in FIG. 6, to a processor 6.

In the processor 6, the first image is decomposed into a luminance signal and color difference signals (#20). The luminance signal is expressed by the formula L=WrR+WgG+Wb (where BWr, Wg, and Wb are constants for the conversion of RGB signals into a luminance signal; for example, in SDTV and the like, the formula (Wr, Wg, Wb)=(0.299, 0.587, 0.114) is used). The color difference signals are expressed by Cb=Wcb (B−Y), Cr=Wcr (R−Y) (where, Wcb and Wcr are constants for the conversion of RGB signals into color difference signals; for example, in SDTV and the like, the formula (Wcb, Wcr)=(0.564, 0.713) is used). It is also possible to use RGB components themselves for corresponding point search, in which case, instead of the luminance signal, the G component is used.

Next, corresponding point search between the luminance signal of the first image and the second image is performed (#30). A commonly known method for corresponding point search is SSD (sum of squared differences), which is expressed by the following formula:

$$SSD_{i,j}(x, y) = \sum_{w_1} \sum_{w_2} |p_1(i+w_1, j+w_2) - p_2(i+w_1-x, j+w_2-y)|^2$$

where
i,j represent the indices of the pixel at the position to be evaluated;
x, y represent parallax;
p(i,j) represents the luminance at the pixel; and
w1, w2 represent the window size to be compared with.

In corresponding point search using SSD, the sum of the squares of differences between a pixel of interest and pixels surrounding it is calculated to determine the degree of agreement. To identify where on an image p2 the position corresponding to the position (i, j) on an image p1 is shot, x and y are scanned in an appropriate span to find the x and y that give the least SSD. From the parallax thus found, a distance image may be generated so that an image from a different viewpoint is generated and output.

Next, the color difference signals of the first image are compensated for the parallax to be made the color difference signals of the second image (#40). Then, as shown in FIG. 6, the first and second images (in color) obtained are fed to a first and a second image display apparatus 7L and 7R respectively, and the data processing ends.

While the first subject image 5L is a color image, corresponding point search is performed between the first and second subject images 5L and 5R so that, based on the correspondence between them, the second subject image 5R is restored into a color image. Thus, even when the light in the second wavelength range is G' monochrome light, through corresponding point search, the second subject image 5R can be restored into a color image. Moreover, when a binocular color parallax image is generated, using the color difference signals of the first subject image 5L as color information of the second subject image 5R permits the second subject image 5R to be restored into a color image based on the color difference signals of the color image of the first subject 5L; here, since the human eye is not very sensitive to variation in color signals, the color difference signals of the first subject image may be used unprocessed, or may be shifted by the amount corresponding to the calculated parallax.

Since the light in the second wavelength range is monochrome light, second image recording of the second subject image 5R can be performed with improved resolution, and also in a larger shooting area, resulting in higher immunity to variation in brightness (for example, twice the shooting area of G in a Bayer array). This helps enhance the precision of stereoscopic matching. Moreover, since the second subject image 5R is monochrome, cost reduction is possible, and software can be used that is no different from that for conventional stereoscopy.

Figure 8:
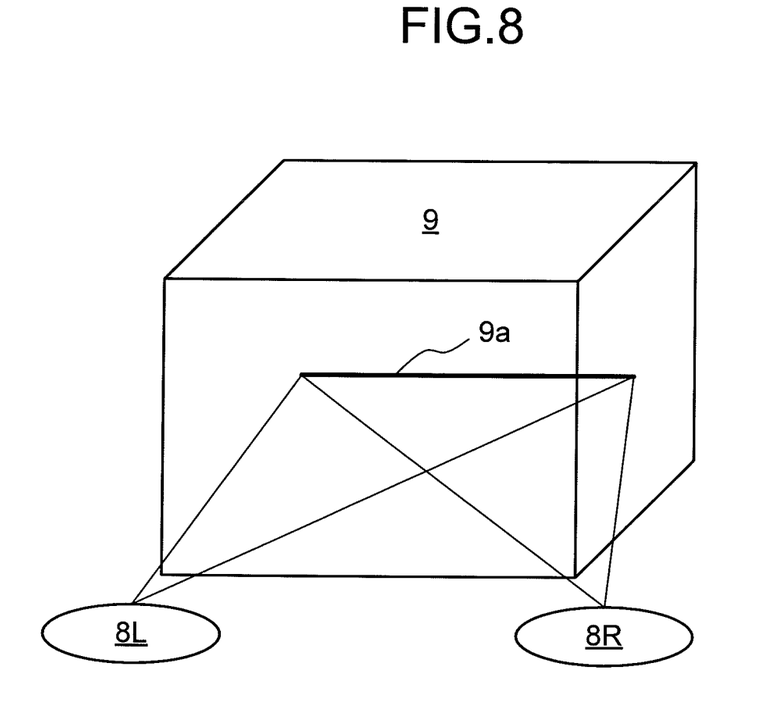
FIG. 8 is a conceptual diagram showing a left and a right viewpoint with respect to a subject.

As described above, the second image, which records G' alone, has high theoretical resolution, and the second shooting optical system KR can be specialized for monochrome light, making it easy to obtain high performance. With this high performance, it is possible to improve the color rendering precision in the other image, that is, the first image. That is, while a luminance signal is generally estimated from the values of G above, below, left, and right and R or B signals above them, also using nearby G' components helps further improve the precision. FIG. 8 shows a left and a right viewpoint 8L and 8R with respect to a subject 9, and FIGS. 9A to 9D schematically show data supplementation using G' components.

Figure 9A:
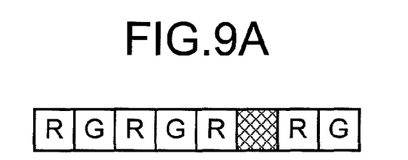
FIGS. 9A to 9D are diagrams illustrating data supplementation by using G' components.
Figure 9B:
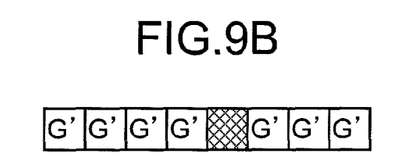
Figure 9C:
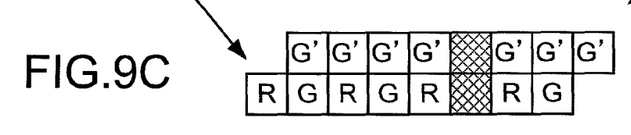
Figure 9D:
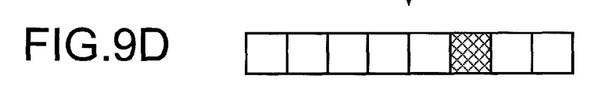

In FIG. 8, consider the left and right viewpoints 8L and 8R with respect to a line 9a as part of the subject 9. Then, FIG. 9A shows the pixel line (the output of an RGB region) on the image sensing device 4 which corresponds to the left viewpoint 8L, and FIG. 9B shows the pixel line (the output of a G' region) on the image sensing device 4 which corresponds to the right viewpoint 8R. As will be understood from a comparison between FIGS. 9A and 9B, the corresponding pixels (cross-hatched parts) are displaced by the amount corresponding to parallax. A G component in FIG. 9A is estimated in the following manner. The entire first image is converted into a luminance signal, and then, as shown in FIG. 9C, through corresponding point search with the second image of G', the mutually corresponding positions are put together (FIG. 7, #30). The corresponding point search is performed on closely located G and G' signals, and meanwhile any pixel having no G value is ignored. Based on the result of the RGB corresponding point search, G' is compensated for the parallax and is overwritten to the value of G. FIG. 9D shows an RGB-side color image thus generated.

As described above, when a luminance signal is generated from an image in a Bayer array, corresponding point search is performed in the second image sensing area 4R for a color component of a wavelength close to the luminance signal, and based on the result of the corresponding point search, luminance information for supplementation is obtained from a luminance signal in the second image sensing area 4R. With this configuration, when stereoscopic matching is performed, images of wavelengths as close to each other as possible are compared, resulting in higher precision. As described above, the calculated parallax may be used to correct the luminance signal of the first image with the luminance signal of the second image; for example, the luminance signal of the second image may be shifted by the amount corresponding to the calculated parallax to overwrite the luminance signal of the first image. Since the parallax is minute, a method may be adopted that does not compensate for the parallax in order to thereby increase the speed of the processor 6.

Features of Different Embodiments of the Invention

As will be understood from the foregoing, embodiments of the invention encompass stereoscopic image shooting apparatus having the following configurations ($\alpha 1$) to ($\alpha 8$).

($\alpha 1$): A stereoscopic image shooting apparatus of a compound-eye type which performs stereoscopic shooting of a subject by use of a single image sensing device and two shooting optical systems, characterized in that: the two shooting optical systems include a first shooting optical system for forming a first subject image composed of light in a first wavelength range alone and a second shooting optical system for forming a second subject image composed of light in a second wavelength range alone, the second wavelength range being different from the first wavelength range; the image sensing device has an image sensing surface divided into a first image sensing area for recording the first subject image and a second image sensing area for recording the second subject image; and the image sensing device has, on the image sensing surface, a wavelength filter that transmits, in the first image sensing area, the light in the first wavelength range alone and, in the second image sensing area, the light in the second wavelength range alone.

($\alpha 2$): The stereoscopic image shooting apparatus having the configuration ($\alpha 1$) above, further characterized in that: the light in the second wavelength range is monochrome light.

($\alpha 3$): The stereoscopic image shooting apparatus having the configuration ($\alpha 2$) above, further characterized in that: the first subject image is a color image; corresponding point search is performed between the first and second subject images; and based on correspondence between the first and second subject images, the second subject image is restored into a color image.

($\alpha 4$): The stereoscopic image shooting apparatus having the configuration ($\alpha 3$) above, further characterized in that: when a binocular color parallax image is generated, a color difference signal of the first subject image is used as color information of the second subject image.

($\alpha 5$): The stereoscopic image shooting apparatus having the configuration ($\alpha 3$) or ($\alpha 4$) above, further characterized in that: in the first image sensing area, pixels are arranged in a Bayer array; when a luminance signal is generated from an image in the Bayer array; corresponding point search is performed in the second image sensing area for a color component of a wavelength close to the luminance signal; and based on a result of the corresponding point search, luminance information for supplementation is obtained from a luminance signal in the second image sensing area.

($\alpha 6$): The stereoscopic image shooting apparatus having any of the configurations ($\alpha 1$) to ($\alpha 5$) above, further characterized in that: a main wavelength span of the second wavelength range is between 560 nm and 590 nm.

($\alpha 7$): The stereoscopic image shooting apparatus having any of the configurations ($\alpha 1$) to ($\alpha 5$) above, further characterized in that: a main wavelength span of the second wavelength range is between 700 nm and 900 nm.

(α8): The stereoscopic image shooting apparatus having any of the configurations (α1) to (α7) above, further characterized in that: at least one of the two shooting optical systems has at least one reflective surface that deflects an optical path by reflection and simultaneously restricts wavelength of light.

With the configuration (α1), the wavelength filter on the image sensing surface transmits, in the first image sensing area, light in the first wavelength range alone and, in the second image sensing area, light in the second wavelength range alone. In this way, the first and second subject images that are composed of light of mutually different wavelengths in stereoscopy are shot. Here, even if the image circles of the first and second subject images overlap, a clear image is obtained. In addition, no extra component such as a partition wall is needed. Thus, it is possible, with a simple and easy-to-adjust optical structure, to prevent image degradation due to intrusion between left and right image circles, advantageously from the perspective of cost as well.

With the configuration (α2), since the light in the second wavelength range is monochrome light, the second subject image can be recorded with improved resolution, and also in a larger shooting area, resulting in higher immunity to variation in brightness (for example, twice the shooting area of G in a Bayer array). This helps enhance the precision of stereoscopic matching.

With the configuration (α3), even when the light in the second wavelength range is monochrome light, through corresponding point search, the second subject image can be restored into a color image. With the configuration (α4), based on the color difference signals of the first subject image, which is a color image, the second subject image is restored into a color image. Here, since the human eye is not very sensitive to variation in color signals, the color difference signals of the first subject image may be used unprocessed, or may be shifted by the amount corresponding to the calculated parallax.

With the configuration (α5), when a luminance signal is generated from an image in a Bayer array, corresponding point search is performed in the second image sensing area for a color component of a wavelength close to the luminance signal. Thus, when stereoscopic matching is performed, images of wavelengths as close to each other as possible are compared, resulting in higher precision.

With the configuration (α6), since the main wavelength span of the second wavelength range is between 560 nm and 590 nm, through stereoscopic matching in a green image, parallax information can be generated in information to which the human eye is highly sensitive. If the light in the first wavelength range and the light in the second wavelength range that form the subject image overlap, the light forming the subject image needs to be split, leading to poor color rendering in the subject image. With the configuration (α7), the second wavelength range covers near-infrared light of 700 nm to 900 nm, which has little effect on the color subject image, resulting in enhanced color rendering in the color subject image.

With the configuration (α8), at least one of the shooting optical systems serves, with its reflective surface, as a deflecting optical system. This helps secure a sufficient distance in the lateral direction to obtain parallax between the left and right sides. Moreover, since the reflective surface has the wavelength restricting function, its use combined with a color filter helps reduce cost.

What is claimed is:

1. A stereoscopic image capturing apparatus, comprising:
a first imaging optical system configured to form a first subject image with light only in a first wavelength range;
a second imaging optical system configured to form a second subject image with light only in a second wavelength range, the second wavelength range being different from the first wavelength range;
a mirror configured to transmit light other than light in the second wavelength range;
a single image sensing device having an image sensing surface divided into:
a first image sensing area on which the first subject image is formed to be captured, and
a second image sensing area on which the second subject image is formed to be captured; and
a wavelength filter provided on the image sensing surface of the single image sensing and having:
a first portion configured to transmit, of the light in the first wavelength range and the light in the second wavelength range, only the light in the first wavelength range so as to transmit the first subject image formed by the first imaging optical system onto the first image sensing area, and
a second portion configured to transmit, of the light in the first wavelength range and the light in the second wavelength range, only the light in the second wavelength range so as to transmit the second subject image formed by the second imaging optical system onto the second image sensing area,
wherein:
the first imaging optical system includes the mirror,
the light in the first wavelength range comprises light of three wavelengths of red, green, and blue respectively,
a main wavelength span of the second wavelength range is between 560 nm and 590 nm, and
a peak wavelength of the light in the second wavelength range differs from a peak wavelength of a green component of the light in the first wavelength range.

2. The stereoscopic image capturing apparatus according to claim 1, wherein
the light in the second wavelength range is monochrome light.

3. The stereoscopic image capturing apparatus according to claim 2, wherein
the first subject image is a color image,
corresponding point search is performed between the first and second subject images, and
based on correspondence between the first and second subject images, the second subject image is restored into a color image.

4. The stereoscopic image capturing apparatus according to claim 3, wherein
when a binocular color parallax image is generated, a color difference signal of the first subject image is used as color information of the second subject image.

5. The stereoscopic image capturing apparatus according to claim 3, wherein
in the first image sensing area, pixels are arranged in a Bayer array,
when a luminance signal is generated from an image in the Bayer array,
corresponding point search is performed in the second image sensing area for a color component of a wavelength close to the luminance signal, and based on a result of the corresponding point search, luminance information for supplementation is obtained from a luminance signal in the second image sensing area.

6. The stereoscopic image capturing apparatus according to claim 4, wherein in the first image sensing area, pixels are arranged in a Bayer array, when a luminance signal is generated from an image in the Bayer array, corresponding point search is performed in the second image sensing area for a color component of a wavelength close to the luminance signal, and based on a result of the corresponding point search, luminance information for supplementation is obtained from a luminance signal in the second image sensing area.

7. The stereoscopic image capturing apparatus according to claim 1, wherein at least one of the first and second imaging optical systems has at least one reflective surface that deflects an optical path by reflection and simultaneously restricts wavelength of light.

8. The stereoscopic image capturing apparatus according to claim 2, wherein at least one of the first and second imaging optical systems has at least one reflective surface that deflects an optical path by reflection and simultaneously restricts wavelength of light.

9. The stereoscopic image capturing apparatus according to claim 3, wherein at least one of the first and second imaging optical systems has at least one reflective surface that deflects an optical path by reflection and simultaneously restricts wavelength of light.

10. The stereoscopic image capturing apparatus according to claim 4, wherein at least one of the first and second imaging optical systems has at least one reflective surface that deflects an optical path by reflection and simultaneously restricts wavelength of light.

11. A stereoscopic image capturing apparatus, comprising:

a first imaging optical system configured to form a first subject image with light only in a first wavelength range;

a second imaging optical system configured to form a second subject image with light only in a second wavelength range, the second wavelength range being different from the first wavelength range;

a single image sensing device having an image sensing surface divided into:

a first image sensing area on which the first subject image is formed to be captured, and a second image sensing area on which the second subject image is formed to be captured; and a wavelength filter provided on the image sensing surface of the single image sensing device and having:

a first region arranged on the first image sensing area of the single image sensing device to block transmission of the light in the second wavelength range so as to transmit the first subject image formed by the first imaging optical system onto the first image sensing area, and a second region arranged on the second image sensing area of the single image sensing device to block transmission of the light in the first wavelength range so as to transmit the second subject image formed by the second imaging optical system onto the second image sensing area, wherein:

of the first and second subject images, one is a color image and the other is a monochrome image, mutually corresponding pixels are determined between pixels included in the first subject image formed on the first image sensing area to be captured and pixels included in the second subject image formed on the second image sensing area to be captured, and pixel values of pixels constituting the monochrome image are made equal to pixel values of color components of corresponding pixels constituting the color image.

12. The stereoscopic image capturing apparatus according to claim 11, wherein the second subject image is the monochrome image, the first subject image is the color image, a corresponding point search is performed between the first and second subject images, and based on correspondence between the first and second subject images, the second subject image is restored into a color image.

13. The stereoscopic image capturing apparatus according to claim 12, wherein when a binocular color parallax image is generated, a color difference signal of the first subject image is used as color information of the second subject image.

14. The stereoscopic image capturing apparatus according to claim 12, wherein in the first image sensing area, pixels are arranged in a Bayer array, when a luminance signal is generated from an image in the Bayer array, corresponding point search is performed in the second image sensing area for a color component of a wavelength close to the luminance signal, and based on a result of the corresponding point search, luminance information for supplementation is obtained from a luminance signal in the second image sensing area.

15. The stereoscopic image capturing apparatus according to claim 11, wherein a main wavelength span of the second wavelength range is between 560 nm and 590nm.

16. The stereoscopic image capturing apparatus according to claim 11, wherein a main wavelength span of the second wavelength range is between 700 nm and 900 nm.

17. The stereoscopic image capturing apparatus according to claim 11, wherein at least one of the first and second imaging optical systems has at least one reflective surface that deflects an optical path by reflection and simultaneously restricts wavelength of light.

* * * * *